United States Patent
Rittiger et al.

[11] 3,772,177
[45] Nov. 13, 1973

[54] OXYGEN SENSORS
[75] Inventors: Robert S. Rittiger, Apollo; Charles K. Russell, Murrysville, both of Pa.
[73] Assignee: United States Steel Corporation, Pittsburgh, Pa.
[22] Filed: Dec. 23, 1971
[21] Appl. No.: 211,444

[52] U.S. Cl. .................................. 204/195 S
[51] Int. Cl. ......................................... G01n 27/46
[58] Field of Search ...................... 204/1 T, 195 S

[56] References Cited
UNITED STATES PATENTS
3,464,008  8/1969  Meysson et al ............. 204/195 S
3,481,855  12/1969  Kolodney et al. ............. 204/195 S FOREIGN PATENTS OR APPLICATIONS
2,010,452  2/1970  France ............................ 204/195 S
37,800  6/1962  Germany ........................ 204/195 S Primary Examiner—T. Tung
Attorney—Rea C. Helm

[57] ABSTRACT

A solid electrolyte galvanic cell with a metal-oxide reference electrode for determining the oxygen content of high temperature fluids has a portion of the electrolyte projecting into the mass of the reference electrode contained inside a quartz tube. The electrolyte is cemented inside the end of the quartz tube.

7 Claims, 4 Drawing Figures

Patented Nov. 13, 1973

3,772,177

OXYGEN SENSORS

This invention relates to improvements in oxygen sensors for determining the oxygen content of liquid metals or hot gases and more particularly to sensors which measure the emf between the outer side of a block of solid oxide electrolyte supported in the end a refractory tube in contact with the fluid of unknown oxygen content and the inner side of the electrolyte in contact with a solid oxygen reference electrode inside the tube.

A typical construction of such oxygen sensors includes a quartz tube holding a block of a solid oxide electrolyte in one end of the tube thus sealing the end of the tube. A solid reference electrode is contained inside the tube and contacts the inside end of the electrolyte block while the oxygen containing liquid metal or gas contacts the outside of the cylinder and the outside of the quartz tube. One method of sealing the electrolyte block to the quartz tube is by fusing the quartz around the electrolyte. The end of the quartz tube is heated to softening temperature so that the quartz flows around the block. Upon cooling the quartz resolidifies to form a tight seal. The seal may be improved by water quenching the assembly immediately after the quartz tube has flowed around the block. This method requires careful heating and cooling so that the quartz does indeed flow yet does not crack upon cooling. Similarly, the electrolyte block may crack and completely fracture upon the heating or cooling of the adjacent quartz since it is also heated and cooled at the same time. Although the units thus assembled are inspected and subjected to a non-destructive test prior to use, it is inevitable that this severe thermal cycle in assembly may cause units to possess undetected thermal microcracks and subsequent premature failure in use. The fusion of an oxide electrolyte block into a fused quartz tube is difficult to automate to achieve a high manufacturing rate for a galvanic cell, necessitates inspection for thermal cracking and inevitably causes some units to fail in subsequent use.

When the reference electrode inside the tube is a mixture of a metal and its oxide, there is a tendency for the electrode mass to sinter and contract when subjected to the temperature of use, as for example in steel at about 1,500°C to 1,600°C. In addition, the mass tends to contract around an electrical contact rod which passes through the mass to contact the electrolyte. The contraction tends to diminish the electrical contact with the electrolyte which results in short and sometimes unstable emf readings.

In accordance with our invention, we provide a refractory cement to hold the solid electrolyte cylinder in place in the refractory tube thereby eliminating the fusing and quenching operation. In addition, inspection for thermal cracks due to fusion may also be eliminated. An inorganic cementing agent is used which forms a seal which is no more gas permeable than a typical dense sintered zirconia electrolyte cylinder. The inside end of the solid electrolyte cylinder has a frustrum shape so that as the reference material is heated and sinters and tends to shrink, it will maintain a tight ring-like contact with the electrolyte. By spacing the electrical contact rod away from the electrolyte and relying on the metal powder of the reference material to make electrical contact with the electrolyte, the thermal expansion of the contact rod is then used to help the sintering reference electrode mass to maintain electrical contact with the electrolyte by pushing the mass towards the electrolyte. As a result, the emf readings obtained will be more stable and will have a tendency towards longer duration.

It is therefore an object of our invention to provide an improved oxygen sensor in which the solid electrolyte is cemented to a refractory tube electrolyte holder.

Another object is to provide an oxygen sensor that does not need fusing or quenching in the manufacturing process.

Still another object is to provide an oxygen sensor that provides longer and more stable emf readings.

These and other objects will become more apparent after referring to the following drawings and specification in which.

Figure 1:
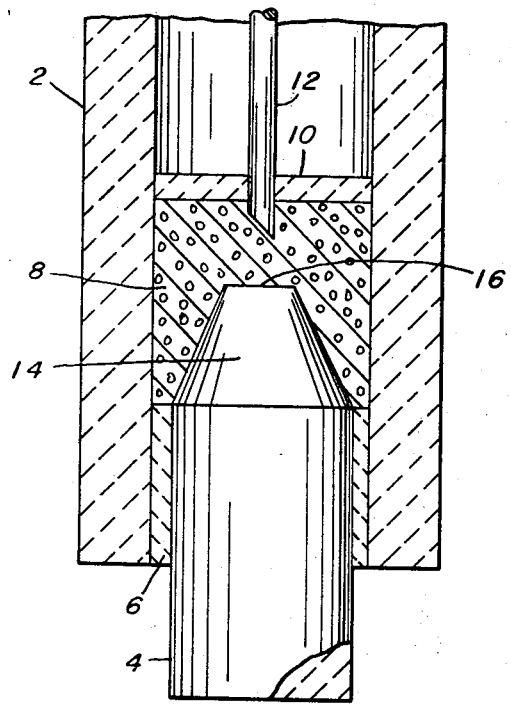
FIG. 1 is a partial sectional view of a galvanic cell according to the preferred embodiment of our invention.

Referring now to FIG. 1, reference numeral 2 indicates a refractory tube which supports a block of solid electrolyte 4. Tube 4 may be round and of quartz about 0.13 inches inside diameter and about 0.23 inches outside diameter. Electrolyte 4 may be a dense sintered cylinder of lime stabilized zirconia about 0.18 inches long and about 0.12 inches in diameter. The electrolyte cylinder should be about 0.01 inches smaller in diameter than the inside diameter of tube 4. A refractory cement 6 holds the electrolyte cylinder 4 in place. A reference electrode 8, which may be a mixture of a metal and its oxide, such as $Cr-Cr_2O_3$, is located inside the tube and is held in place by a washer 10. Washer 10 may be refractory wool, such as "Kaowool" manufactured by Babcock and Wilcox Co. A contact rod 12, which may be molybdenum, penetrates washer 10 and contacts electrode 8. The upper end of tube 4 and contact rod 12 are attached to a suitable holder (not shown) for insertion into molten metal or hot gas and suitable electrical connections are made to a suitable emf measuring apparatus.

In assemblying the cell as shown in FIG. 1, a cement is prepared by mixing a thin slurry of water and a calcium aluminate refractory cement, such as Type CA-25 manufactured by the Aluminum Company of America. The cement should have a particulate size of nominally minus 200 mesh. Other similar suitable cements are known as "Lumnite" and "Refcon" manufactured by the Universal Atlas Cement Division of the United States Steel Corporation. The sides, but not the ends of the electrolyte block 4 are coated with the slurry 6, the excess wiped off, particularly the ends of the electrolyte block 4, and after the cement has set, the assembly is air dried several hours at 100°C to drive off any excess water. The electrode mixture 8 is placed in the tube, tamped, contact rod 12 and washer 10 are positioned to complete the assembly. In place of the washer, rod 12 may be placed in position and a layer of the same type of cement as is used to seal block 4 to tube 2 is cast in top of the electrode 8 and around the contact rod 12. After the cement has set, the cell is again air dried to drive off excess moisture. Tests indicate that the cement layer 6 is at least as gas tight as dense sintered lime stabilized zirconia and makes a tight bond with both the quartz and the zirconia.

When the cell is plunged into the liquid steel to a depth sufficient to rapidly bring the cell up to operating temperature, the zirconia electrolyte 4 and the quartz tube 2 heat up and expand at different rates. However, since the cement is not as strong as either the zirconia or the quartz and is porous, but not permeable, it acts as a cushion between the tube and the electrolyte thereby reliably eliminating fracturing of either the quartz tube 2 or the zirconia electrolyte 4.

When electrode 8 begins to sinter and contract, contact is maintained with electrolyte 4 because the electrode shrinks tightly around frustrum 14 of the electrolyte 4. While a frustrum is shown, with a preferred taper angle of from about 30° to 45°, any projecting structure, preferably circular, may be used, so long as the contraction of the mixture tends to maintain or improve contact. As shown in FIG. 1, it is preferred that about one third of the length of electrolyte block 4 be exposed to the liquid metal, about one-third is cemented to the tube and about one-third is the frustrum, but these proportions are not critical. Contact rod 12 should end about midway between the end 16 of electrolyte block 4 and washer 10 to derive the maximum benefit of the thermal expansion force of rod 12 to push the electrode 8 down onto the frustrum 14. The metal in the mixture 8 serves to make the required electrical contact between rod 12 and electrolyte 4.

Figure 2:
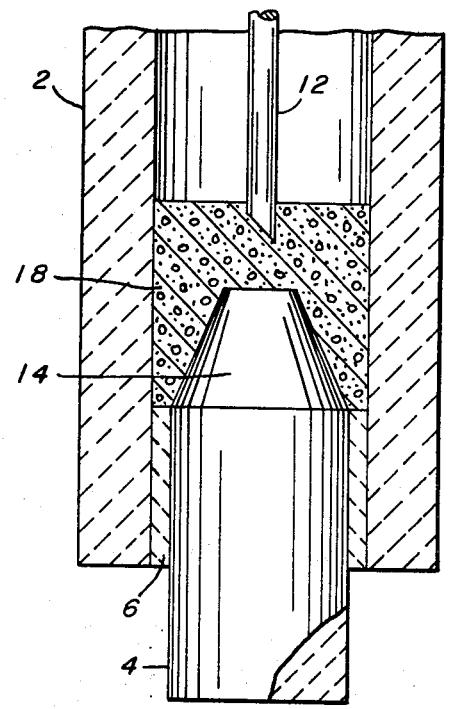
FIG. 2 is a partial sectional view of a galvanic cell according to an alternative embodiment of our invention.

In the embodiment shown in FIG. 2, electrolyte 4 is cemented in tube 4 by cement 6 as previously described. Electrode 18 is a mixture of a metal and its oxide mixed with 10 to 20 percent of refractory cement which may be the same type cement as previously described. The cemented electrode is cast around wire 12 and frustrum 14, and air dried after setting. The proportion of cement in the mixture must be small enough to not interfere with electrical contact with the electrolyte and the performance of the reference material as an oxygen source.

Figure 3:
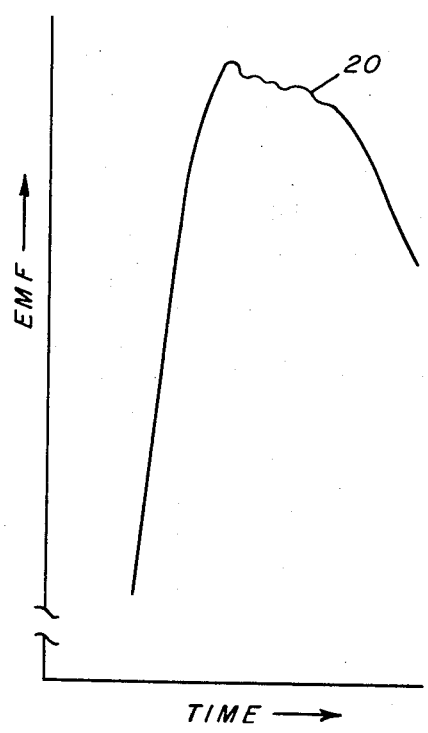
FIG. 3 is an emf-time chart showing the operation of a galvanic cell without an electrolyte frustrum.
Figure 4:
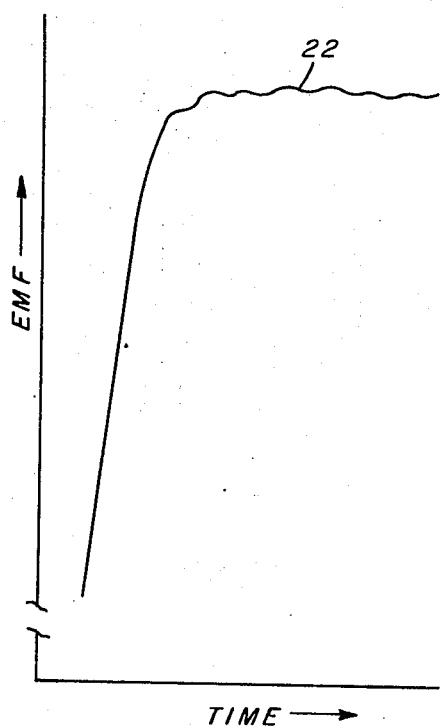
FIG. 4 is an emf-time chart showing the operation of a galvanic cell with an electrolyte frustrum.

FIG. 3 illustrates a graph of an electrical output from a typical oxygen sensor in which the frustrum section is not included. The abscissa is in units of time; the ordinate is in units of emf. Note that at reference numeral 20 there are inconsistencies in the electrical output of the cell as the sintering and shrinking takes place. In FIG. 4 a similar chart is shown with the frustrum and the rod 12 spaced away from the electrolyte. In this case at reference numeral 22, the output of sensor occurs earlier and is much more stable than in previous figure.

We claim:

1. In a galvanic cell for determining oxygen content of a high temperature fluid having a solid oxide electrolyte block mounted in one end of a refractory tube with one end of said block contacting the fluid and the other end of the block contacting a powder mixture of a metal and its oxide as a reference electrode inside the tube, the improvement comprising means for retaining the mixture in electrical contact with the electrolyte and a portion of the electrolyte block inside the tube has a shape so that part of the mixture surrounds said portion while retained in place within the tube.

2. A cell according to claim 1 in which said portion has a circular cross-section.

3. A cell according to claim 2 in which the means for retaining the mixture includes a washer fitting snugly inside said tube against said mixture and an electrical contact rod projecting through said washer and into said mixture.

4. A cell according to claim 2 in which the means for retaining the mixture includes a calcium aluminate cement mixed with the mixture of a metal and its oxide and an electrical contact rod projecting into the resultant mixture.

5. A cell according to claim 1 in which said portion is a frustrum with an angle of taper between 30° and 45° and the large end directed towards said one end of the block.

6. A cell according to claim 5 in which the means for retaining the mixture includes a washer fitting snugly inside said tube against said mixture and an electrical contact rod projecting through said washer and into said mixture.

7. A cell according to claim 5 in which the means for retaining the mixture includes a calcium aluminate cement mixed with the mixture of a metal and its oxide and an electrical contact rod projecting into the resultant mixture.

* * * * *